May 19, 1931.  V. J. MATHIEU  1,805,831
RETOOTHING MACHINE
Filed March 5, 1929  3 Sheets-Sheet 1
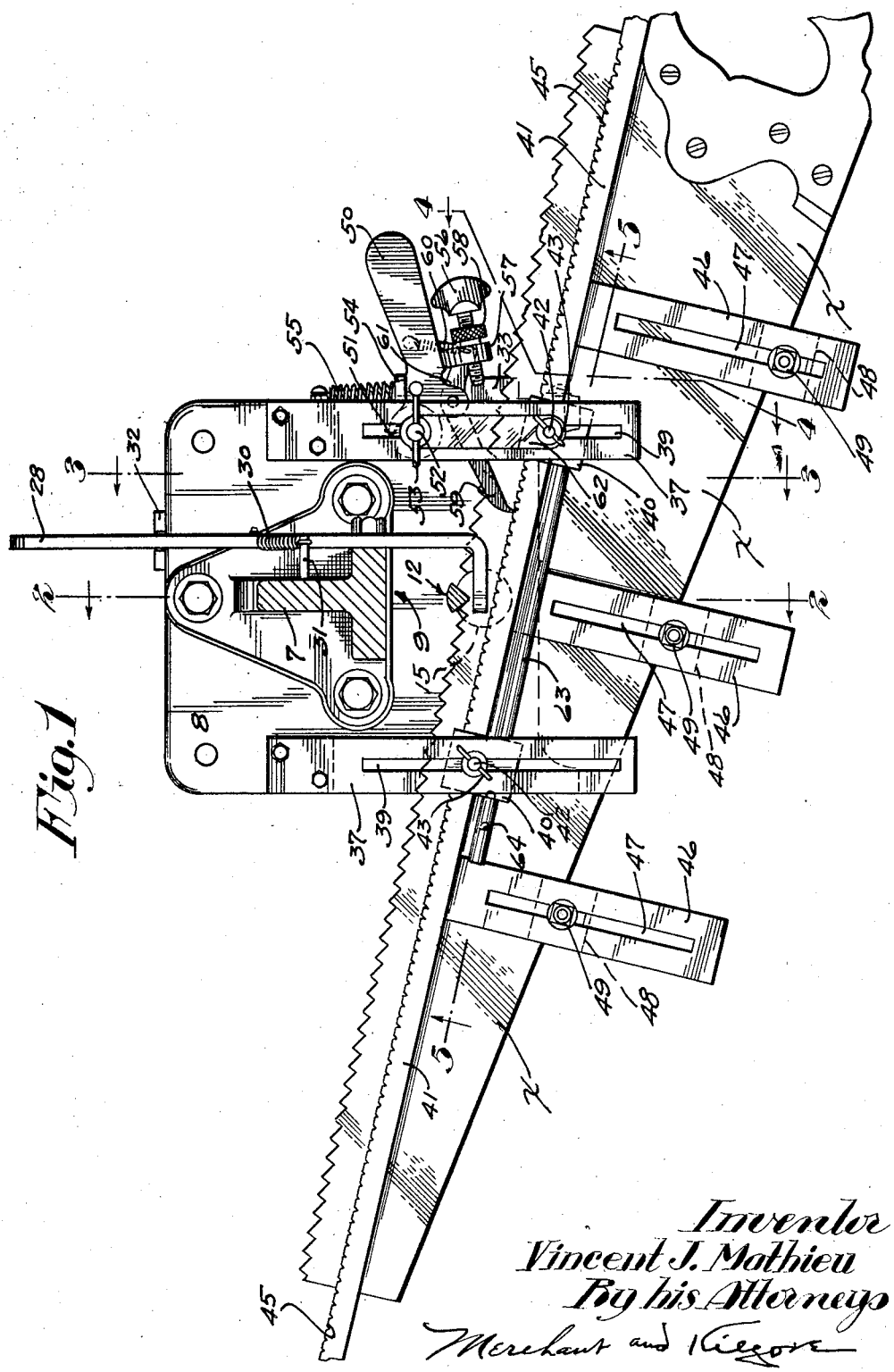
Inventor
Vincent J. Mathieu
By his Attorneys
Merchant and Kilgore

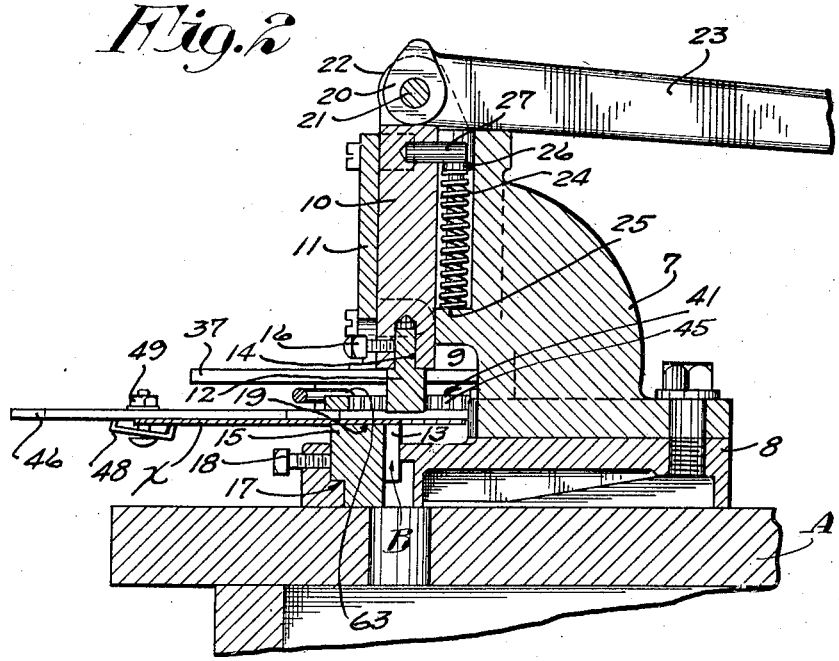
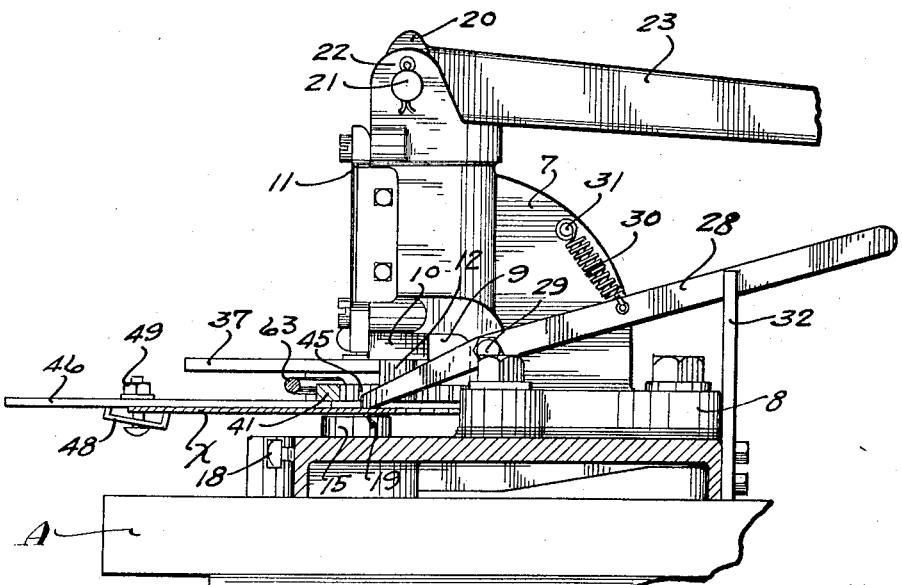

May 19, 1931.  V. J. MATHIEU  1,805,831
RETOOTHING MACHINE
Filed March 5, 1929  3 Sheets-Sheet 3
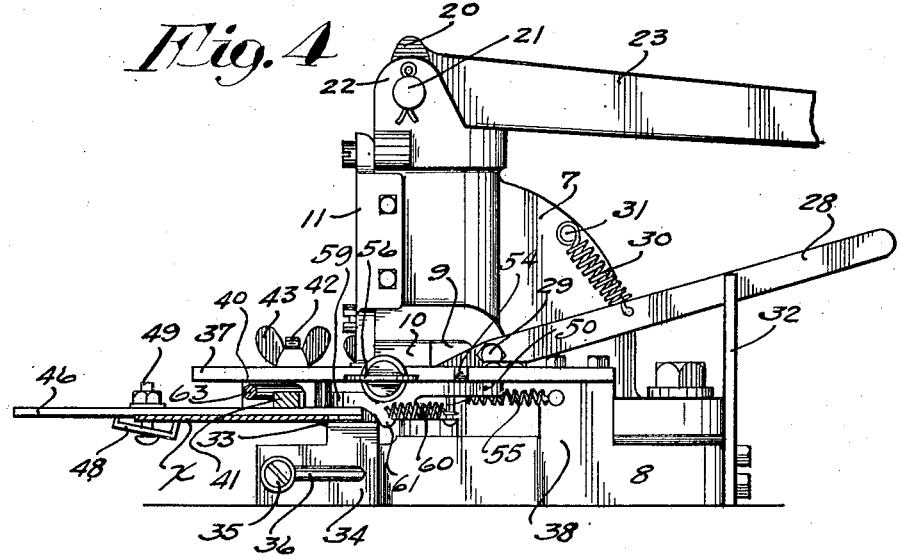
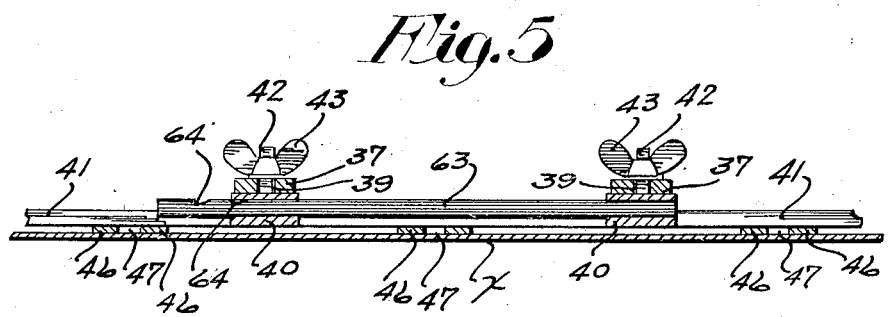
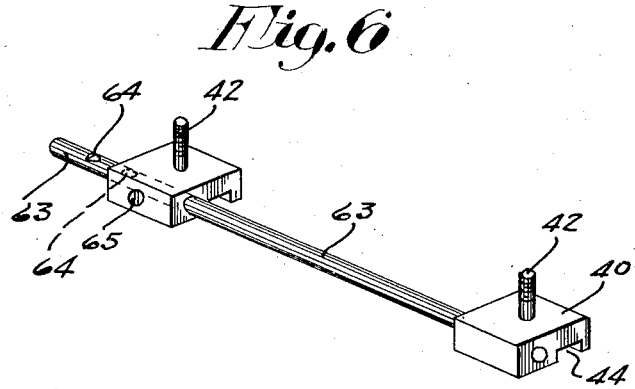
Inventor
Vincent J. Mathieu
By his Attorneys
Merchant and Kilgore Patented May 19, 1931

1,805,831

UNITED STATES PATENT OFFICE

VINCENT J. MATHIEU, OF NEW BEDFORD, MASSACHUSETTS, ASSIGNOR TO FOLEY SAW TOOL COMPANY, INCORPORATED, OF MINNEAPOLIS, MINNESOTA, A CORPORATION OF MINNESOTA

RE-TOOTHING MACHINE

Application filed March 5, 1929. Serial No. 344,415.

My invention has for its object to provide a simple and highly efficient retoothing machine intended for general use, but especially well adapted for use in retoothing old hand saws, whereby new teeth are formed on a saw on the predetermined line independent of the old teeth on the saw, and in which the old teeth are removed from the saw by the very act of forming the new teeth.

The above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a view principally in plan with some parts sectioned and other parts broken away;

Fig. 2 is a view principally in vertical section taken on the line 2—2 of Fig. 1;

Fig. 3 is a view principally in right side elevation with some parts sectioned on the line 3—3 of Fig. 1;

Fig. 4 is a view principally in right side elevation with some parts sectioned on the line 4—4 of Fig. 1;

Fig. 5 is a view partly in elevation and partly in section taken on the line 5—5 of Fig. 1; and Fig. 6 is a perspective view of the carrier bar guides, and gauge removed from the machine.

The numeral 7 indicates a frame rigidly but detachably secured to a rectangular base 8, bolted to a bench A and which frame 7 at its base is recessed to form a throat 9 between said frame and base. A vertical removable ram 10 that is square in cross-section is slidably mounted in a channel shaped seat in the face of the frame 7 and held in position by a face plate 11 detachably secured by screws to said frame.

A pair of tooth forming dies 12 and 13 are removably mounted in the lower end of the ram 10 and in the base 8 respectively. The die 12, which is removable, is in the form of a punch that is V shaped in cross-section, and the die 13, which is fixed, is in the form of a V shaped notch formed in the periphery of an upright cylindrical block 15 and extends longitudinally thereof to receive the die 12 during its punching action. The removable die 12 engages the lower end of the ram 10 as a base of resistance during its punching action and is provided with a shank 14 which extends into a bore in said ram and is rigidly but detachably held therein by a set screw 16. The block 15 is removably mounted in a cylindrical seat in the top of the base 8 and rests on a shoulder 17. It will be noted that the bottom of the seat within the shoulder 17 is open and leads to an escaped passageway B in the bench A for the escape of pieces of metal punched or cut from a saw during the toothing thereof. A set screw 18 is provided for holding the die 13 in the seat in the base 8. The upper end of the block 15 extends above the top of the base 8 and affords a saw support 19 for that portion of a saw being acted on by the dies 12 and 13 during the formation of a tooth thereon.

A cam 20 is provided for depressing the ram 10 to cause the die 12 to engage a saw on the support 19, and cut or punch a tooth therein with the cooperation of the fixed die 13. This cam 20 is loosely and turnably mounted on a horizontally pivoted pin 21 which extends transversely of the machine and secured at its ends in a pair of laterally spaced bearing lugs 22 on the upper end of the frame 7, and which lugs hold this cam 20 against axial movement on the pin 21. The cam 20 is operated by a hand lever 23 with which said cam is integrally formed. When the cam 20 is in inoperative position the lever 23 projects horizontally rearward from the machine where the same is out of the way. A forward swinging movement of the lever 23 will impart a downward movement to the cam 20 to depress the ram 10 and cause the die 12 to engage a saw on the support 19 and cut or punch a tooth therein with the cooperation of the die 13.

A coil spring 24 resting on a spring seat 25 at the bottom of a recess in the frame 7 has on its upper end a spring cap 26 which engages a laterally projecting stud 27 on the upper end portion of the ram 10 and yieldingly holds said ram raised against the cam 20.

A stripper 28, in the form of a lever, is provided for yieldingly holding a saw on the saw support 19 during the retracting movement of the die 12 as the same moves out of frictional engagement with said saw. This stripper 28 extends horizontally from the front to the rear of the machine at the right of the frame 7, and is intermediately pivoted at 29 to said frame for vertical swinging movement. The short or forward end of the stripper 28 is bent laterally over the saw support 19 and in front of the die 13. A coiled spring 30, attached to the long end of the stripper 28 and anchored to a pin 31 on the frame 7, yieldingly holds the long end of the stripper 28 raised with the short end thereof pressed onto the saw support 19. The stripper 28 is held by a guide 32 against lateral angular movements. This guide 32 is in the form of a flat bar rigidly secured to the rear edge of the base 8, and having a deep notch in which the rear end portions of the stripper 28 works. By depressing the rear end of the stripper 28 the forward end thereof may be raised to permit the insertion of a saw between said stripper and saw support 19, or the stripper 28 may be raised for the insertion of a saw thereunder simply forcing the saw endwise between the support 19 and said stripper.

A secondary saw support 33 is mounted on each side of the saw support 19 for horizontal adjustment. These saw supports 33 are in the same horizontal plane as the saw support 19 for supporting a saw in a horizontal plane transversely of the machine with its toothed edge portion extending into the throat 9. Said saw supports 33 have flat depending bodies 34 that slidably engage the sides of the base 8 and are secured thereto by set screws 35, which extend through horizontal slots 36 in said bodies, and have screw threaded engagement with the base 8. These screws 35 and slots 36 permit adjustment of the saw supports 33, either toward the front of the machine or the rear thereof.

A pair of edgewise spaced forwardly projecting horizontal supports 37, in the form of flat bars, extend transversely of the machine, one on each side of the die 13, and have their rear end portions supported on the tops of bearing blocks 38 and rigidly secured thereto. These blocks 38 are integrally formed with the top of the base 8 and hold said supports in a plane above the top of the saw supports 19 and 33. The supports 37 have longitudinally extended slots 39, and are unsupported above the base 8 except by the blocks 38, which are rearward of the throat 9 in the frame 7. Suspended from the supports 37 is a saw carrier and guide for holding a hand saw X transversely of the machine with its toothed edge portion extending into the throat 9 and loosely resting on the saw supports 19 and 33 for universal movements in the plane of said saw. This saw carrier and guide includes a pair of carrier bar guides, and a carrier bar 41, and which guides are provided with upstanding studs 42 which extend upward through the slots 39 in the supports 37, and having wing nuts 43 applied thereto. These wing nuts 43 rest on the tops of the supports 37, and hold the guides 40 by the studs 42 suspended under said supports. By adjusting the wing nuts on the studs 42, the guides 40 may be frictionally clamped onto the supports 37 and held where set in different adjustments, longitudinally of said supports, or in different rotated adjustments above the axis of the studs 42. The carrier bar 41 is mounted for endwise sliding movement in channel-shaped seats 44 in the undersides of the guides 40. On the rear edge of the carrier bar 41, is a row of longitudinally spaced ratchet teeth with which a dog 59 for imparting tooth spacing movement to cooperate said bar, as will presently appear.

The saw carrier and guide further includes a plurality of saw supports 46, as shown three, in the form of flat bars, which extend transversely and forward of the carrier bar 41 at longitudinally spaced points with their rear end portions underlying said bar, and rigidly secured thereto. These supports 46 are entirely free and unsupported except for their attachment to the carrier bar 41, and have longitudinally extended slots 47. Cooperating with each support 46 for holding a saw X; at its back is a clamp 48 adjustably attached to said support by a nut equipped bolt 49, which extends through an aperature in said clamp, and the slot 47 in said support. The clamps 48 are in the form of flat plates, the front and rear edge portions of which are bent laterally toward the supports 46. Said clamps 48 at their front edge engage the underside of said supports as bases of resistance, and their rear edges engage the underside of the saw and clamp the same onto the supports 46. The bolts 49 are held in the clamps 48 from turning in respect thereto, and the nuts therefor rest on the upper faces of the supports 46.

To mount the saw X in the saw carrier and guide, said carrier and guide is first removed from the machine and placed on said saw with the carrier bar 41 parallel to a line on which new teeth are to be formed in the saw, and which line is sufficiently inward from the old teeth so that they will be removed from the saw simultaneously with the forming of the new teeth thereon. With the saw X thus positioned, the clamps 48 are adjusted on the saw supports 37 until stopped by the engagement of their bolts 49 with the back of said saw and then said nuts are tightened to set the clamps 48 and frictionally clamped the saw X onto the supports 46. After the saw X is properly mounted in the carrier and guide, the carrier bar 41 is inserted endwise into the seats 44 with the tooth edge of the saw positioned to pass over the saw supports 19 and 33 and under the stripper 28.

When the saw X is in the machine, it is in a horizontal position with its back supported by the clamps 48, and at its toothed edge portion supported on the supports 19 and 33, and on which supports the saw rests with freedom for universal movements in its own plane. With the saw X thus held in the machine, the saw carrier and guide is adjusted by sliding the guides 40 longitudinally on the supports 37 to position the tooth edge portion of the saw X between the dies 12 and 13. The line on which the new teeth are to be formed will, of course, be parallel to the carrier bar 41, and which line will be inward of the deepest teeth in said bar so that there will be sufficient stock to form the new teeth.

The saw X may also be angularly adjusted with respect to the dies 12 and 13 to cause said dies to form teeth with the desired pitch. By tightening the wing nuts 43 on the studs 42, the guides will be frictionally clamped on the supports 37 and rigidly held where set to guide the carrier bar 41 and hence the saw X for straight line movement past the dies 12 and 13. A feed device for imparting tooth spacing movement to the carrier bar 41 comprises a lever 50 loosely mounted on a pivot bolt 51 on the underside of the right hand support 37 and has on its upper end a reduced screw-threaded stud 52 which extends upward through the slot 39 in said support, and has applied thereto a wing nut 53. Obviously by tightening the wing nut 53 which rests on the upper face of the right hand support 37, the pivot bolt 51 may be frictionally clamped on the underside of said support and rigidly held where set. The lever 50 is held against axial movement on the bolt 51 by the right hand support 37, and the headed lower end of said bolt.

By reference to Fig. 1, it will be noted that the lever 50 projects horizontally and laterally outward from the right-hand support 37 and at substantially right angles thereto. A stop lug 54, on the rear edge of the lever 50, is arranged to engage the outer longitudinal edge of the right-hand support 37 and limits the rearward or return movement of the lever 50. The forward or operative movement of the lever 50 is limited by an adjustable stop in the form of a thumb-screw 56 having screw-threaded engagement with a lug 57 on, the front longitudinal edge of said lever and arranged to impinge against the support 37 as a stop. A lock nut 58 on the screw 57 is provided for holding said screw where set. Obviously by adjusting the thumb screw 56, the stroke of the lever 50 may be varied at will. A coil spring 55 anchored to the right-hand block 38 and attached to the lever 50 yieldingly holds said lever in an inoperative position. Cooperating with the ratchet teeth 45 is a dog 59 pivoted to the lever 50 and arranged to impart tooth spacing movement to the carrier bar and under the action of the lever 50. A coil spring 60, anchored to the lever 50 and attached to a rear extension 61 on the dog 59, yieldingly holds said dog in engagement with the ratchet teeth 45, and permits said dog to ride over said ratchet teeth during the rearward or inoperative movement of the lever 50. The feed device 50—51 is attached to the right-hand guide and by a link 62, one end of which is pivoted to the stud 42 of said guide, and the other end thereof is pivoted to the stud 52 of said feed device.

Forward movement of the lever 50 until stopped by the screw 56 will cause the dog 59 to engage one of the ratchet teeth 45 and impart a tooth spacing movement to the carrier bar 41 and move the saw X longitudinally between the dies 12 and 13 for a tooth to be formed therein by said dies. The number of teeth per inch to be formed in the saw X may be varied at will by adjusting the stop 56 to change the stroke of the lever 50 and hence the movement of the dog 59.

As previously stated, the pitch of the teeth may be varied at will by adjusting the guides 40 in the supports 37 to vary the angles of the saw X in respect to the dies 12 and 13. The link 62 always keeps the feeding device 50—59 in a definite relation to the carrier bar 41 in all of the various different longitudinal adjustments of the right-hand guide 40 on the respective support 37.

A gauge 63 is provided for use in seating the carrier bar 41 in different angular positions in respect to the dies 12 and 13 to cause said dies to form teeth with a predetermined pitch. This gauge 63 also performs another important function to wit: it keeps the guides 40, in all of their different adjustments with the channeled-seats 44 therein aligned so that the carrier bar 41 may be readily inserted therein by endwise movement when mounting the saw X in the machine. As shown the gauge 63 is in the form of a round rod which extends through bores in the guides 40, and which rod is parallel to the channel-seats 44.

The right-hand guide 40 and the left-hand portion of said gauge is free for longitudinal sliding movement in the left-hand guide 40. Formed in the free end portion of the gauge 63 are two longitudinally spaced notches 64, arranged to be brought in alignment with the left-hand edge portion of the left-hand guide 40 as a positioning surface. The right-hand notch 64, when in alignment with the left-hand guide 40, positions the carrier and guide, and hence the saw X to have formed therein by the dies 12 and 13 teeth for a rip saw, and when the left-hand notch 64 is brought into alignment with said guide, the saw is positioned to cause the dies 12 and 13 to form teeth therein for cross-cut saw. A set screw 65 in the left-hand guide 40 is arranged to impinge against the gauge 63, and hold the same where set in said guide.

From the above description, it is evident that a saw to be retoothed, when mounted in the saw carrier and guide, is guided thereby for straight line movement and tooth spacing movement, which movements are entirely independent of the old teeth on the saw. The carrier bar 41 determines a line parallel thereto on which new teeth are to be formed, and the dies 12 and 13 in forming new teeth simultaneously remove the old teeth. It will thus be seen that by the very act of forming new teeth, the old teeth are removed and the new teeth formed on a line determined by the guide bar 41 without first having to remove the old teeth and shaping the respective edge of the saw to a straight edge. After a saw is mounted in the machine and properly adjusted, the operator by alternately operating the levers 23 and 50, first by means of the lever 23 causes the dies 12 and 13 to form new teeth, and thereafter by means of the lever 50 imparts a tooth spacing movement to the saw to position the same for the next teeth to be formed by the dies. By these simple movements, a saw is retoothed on a predetermined line with the teeth accurately spaced and formed with the proper or desired pitch.

What I claim is:

1. In a saw re-toothing machine, the combination with a tooth forming device including a movable die and means for operating the same, of a saw carrier, means for guiding the carrier for straight line movement past the die, means for imparting a step by step tooth spacing movement to the saw and carrier, and a clamping device for holding a saw on the carrier with the line, on which teeth are to be formed, parallel to the line of movement of the carrier, said carrier being adjustable in the plane of the saw and about the line of movement of the die to vary the pitch of the back edges of the teeth formed by the die.

2. The structure defined in claim 1 in which the carrier is further adjustable in the plane of the saw toward or from the die to vary the distance the teeth are cut from the carrier.

3. In a saw re-toothing machine, the combination with a base, of a tooth forming device on the base including a movable die and means for operating the same, a pair of supports on the base spaced one on each side of the die, a pair of saw carrier guides mounted on the supports for independent adjustment in a plane perpendicular to the movement of the die and offset from said die, said carrier guides also being mounted for turning movement about axis perpendicular to said plane, a saw carrier mounted in said guides for straight line movement past the die, means for imparting a step by step tooth spacing movement to the saw and carrier, and a clamping device for holding a saw on the carrier with the line, on which teeth are to be formed, parallel to the line of movement of the carrier.

4. The structure defined in claim 3 in further combination with a gauge for setting the carrier guides in different adjustments to vary the pitch of the teeth formed by the die.

5. The structure defined in claim 3 in further combination with a gauge comprising a rod connecting the carrier guides and adjustable to vary its operative length and position said guides in different adjustments to vary the pitch of the teeth formed by the die.

In testimony whereof I affix my signature.

VINCENT J. MATHIEU.